United States Patent
Brown et al.

(10) Patent No.: US 9,838,999 B2
(45) Date of Patent: Dec. 5, 2017

(54) PORTABLE ELECTRONIC DEVICE AND METHOD OF CONTROLLING NOTIFICATIONS

(71) Applicant: BLACKBERRY LIMITED, Waterloo (CA)

(72) Inventors: David Andrew Brown, Kitchener (CA); Cody Bryant, Waterloo (CA); Ryan David Steeves, Kitchener (CA)

(73) Assignee: BlackBerry Limited, Waterloo (CA)

( * ) Notice: Subject to any disclaimer, the term of this patent is extended or adjusted under 35 U.S.C. 154(b) by 334 days.

(21) Appl. No.: 14/459,819

(22) Filed: Aug. 14, 2014

(65) Prior Publication Data

US 2016/0050642 A1 Feb. 18, 2016

(51) Int. Cl.
*H04M 1/2745* (2006.01)
*H04M 1/57* (2006.01)
*H04W 68/00* (2009.01)
*H04W 8/22* (2009.01)

(52) U.S. Cl.
CPC ... *H04W 68/005* (2013.01); *H04M 1/274583* (2013.01); *H04M 1/57* (2013.01); *H04W 8/22* (2013.01); *H04M 2250/60* (2013.01)

(58) Field of Classification Search
CPC ...... H04M 3/436; H04M 3/4365; H04M 3/54; H04M 1/72522; H04M 1/72583; H04M 1/72519; H04W 4/12; H04W 4/16; G06F 8/34; G06F 3/0482; G06F 3/04817
USPC ............... 455/414.1, 412.1, 412.2, 413, 566; 715/763, 810, 835, 836; 345/1.1, 2.3
See application file for complete search history.

(56) References Cited

U.S. PATENT DOCUMENTS

| 8,117,304 | B2 | 2/2012 | Grigsby et al. |
| 8,660,038 | B1 * | 2/2014 | Pascazio et al. ............... 370/259 |
| 8,706,096 | B2 * | 4/2014 | Cannon et al. ............... 455/415 |

(Continued)

OTHER PUBLICATIONS

EESR dated Jan. 22, 2016, issued against corresponding European Patent Application No. 15180012.5.

(Continued)

*Primary Examiner* — Anthony Addy
*Assistant Examiner* — Martin Chang
(74) *Attorney, Agent, or Firm* — Borden Ladner Gervais LLP; Geoffrey DeKleine (57) ABSTRACT

A method of controlling a portable electronic device includes, in response to receipt of selection of an option to enter a do not disturb mode at the portable electronic device, suppressing notifications for the communications received at the portable electronic device while in the do not disturb mode. The method also includes, in response to exiting the do not disturb mode, discontinuing suppressing notifications for new communications received at the portable electronic device, providing an option to view the communications received at the portable electronic device while in the do not disturb mode and, in response to receipt of selection of the option to view the communications received while in the do not disturb mode, displaying a consolidated list of the communications received at the portable electronic device while in the do not disturb mode. The consolidated list includes a plurality of electronic communication types.

13 Claims, 5 Drawing Sheets

(56) References Cited

U.S. PATENT DOCUMENTS

| | | | |
|---|---|---|---|
| 2012/0157069 A1* | 6/2012 | Elliott | H04W 4/16 455/418 |
| 2012/0210334 A1* | 8/2012 | Sutedja et al. | 719/314 |
| 2013/0088347 A1 | 4/2013 | Hayes et al. | |
| 2013/0096768 A1 | 4/2013 | Lovett et al. | |
| 2013/0244631 A1* | 9/2013 | Phutane | H04W 4/16 455/414.1 |
| 2013/0267281 A1 | 10/2013 | Miwa | |
| 2013/0290879 A1* | 10/2013 | Greisson | H04M 1/72522 715/764 |
| 2014/0171132 A1 | 6/2014 | Ziemianska et al. | |
| 2015/0133098 A1* | 5/2015 | Warr | 455/418 |

OTHER PUBLICATIONS

Office Action dated Oct. 13, 2016, issued on corresponding EP patent application No. 15180012.5, 5 Pages.

\* cited by examiner

PORTABLE ELECTRONIC DEVICE AND METHOD OF CONTROLLING NOTIFICATIONS

FIELD OF TECHNOLOGY

The present disclosure relates to electronic devices including, but not limited to, portable electronic devices and their control.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones (smart phones), Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. A touch-sensitive input device, such as a touch-screen display, is particularly useful on handheld devices, which are small and may have limited space for user input and output. Improvements in electronic devices with displays are desirable.

BRIEF DESCRIPTION OF THE DRAWINGS

Embodiments of the present disclosure will now be described, by way of example only, with reference to the attached Figures, in which.

DETAILED DESCRIPTION

The following describes an electronic device and a method that includes in response to receipt of selection of an option to enter a do not disturb mode at the portable electronic device, suppressing notifications for the communications received at the portable electronic device while in the do not disturb mode. The method also includes, in response to exiting the do not disturb mode, discontinuing suppressing notifications for new communications received at the portable electronic device, providing an option to view the communications received at the portable electronic device while in the do not disturb mode and, in response to receipt of selection of the option to view the communications received while in the do not disturb mode, displaying a consolidated list of the communications received at the portable electronic device while in the do not disturb mode. The consolidated list includes a plurality of electronic communication types.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, such as a portable electronic device. Examples of portable electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth.

Figure 1:
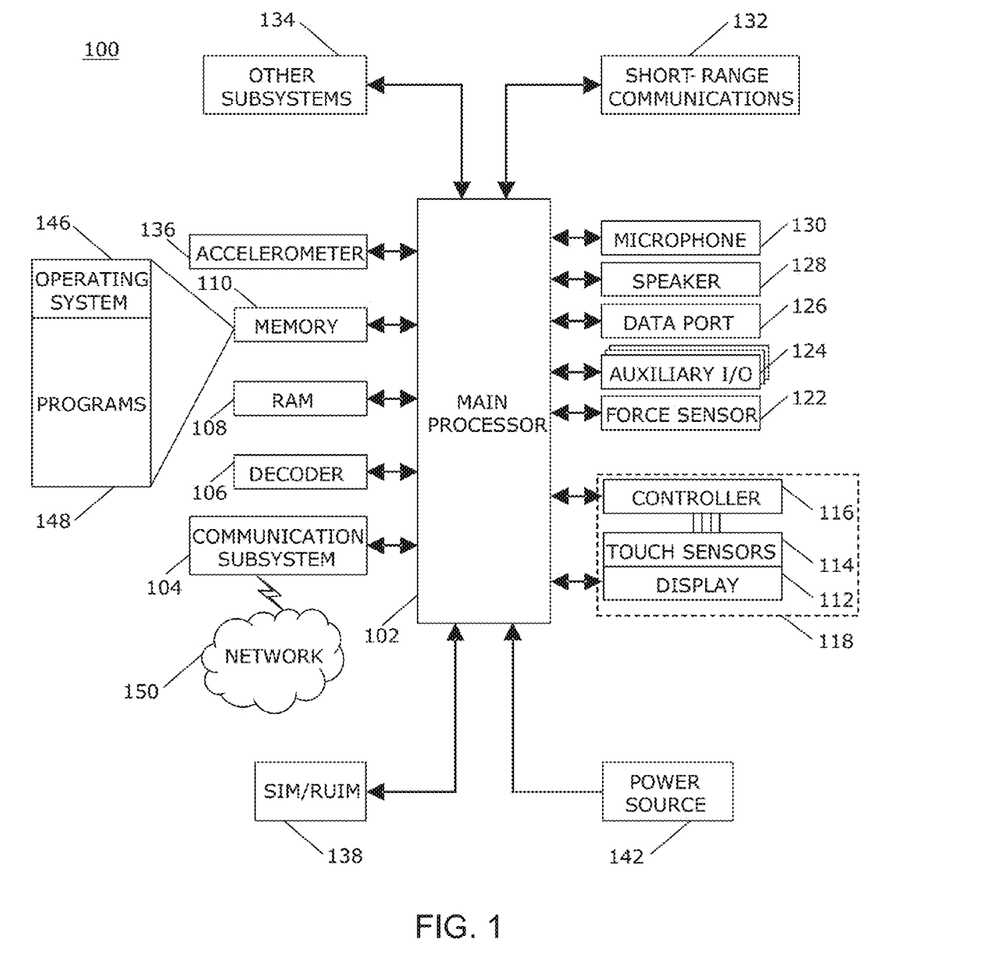
FIG. 1 is a block diagram of an example of a portable electronic device in accordance with the disclosure.

A block diagram of an example of an electronic device 100 is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, one or more force sensors 122, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are coupled to at least one controller 116 that is utilized to interact with the processor 102. Input via a graphical user interface is provided via the touch-sensitive display 118. Thus, the touch sensors 114 and the controller 116 are utilized as an input device. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display. A capacitive touch-sensitive display includes capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected. A tap, which is a particular type of touch on a touch-sensitive display 118 may be a touch that ends within a threshold period of time. Thus, the touch contact with the touch-sensitive display 118 is relatively short because contact ends within a threshold period of time of beginning.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance traveled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

Optional force sensors 122 may be disposed in conjunction with the touch-sensitive display 118 to determine or react to forces applied to the touch-sensitive display 118. The force sensors 122 may be disposed in line with a piezo actuator 120. The force sensors 122 may be force-sensitive resistors, strain gauges, piezoelectric or piezoresistive devices, pressure sensors, quantum tunneling composites, force-sensitive switches, or other suitable devices. Force as utilized throughout the specification refers to force measurements, estimates, and/or calculations, such as pressure, deformation, stress, strain, force density, force-area relationships, thrust, torque, and other effects that include force or related quantities. Optionally, force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

The touch-sensitive display 118 includes a display area in which information may be displayed, and a non-display area extending around the periphery of the display area. Information is not displayed in the non-display area by the display, which non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image is displayed by the display 112 in the non-display area. Optionally, a secondary display, not part of the primary display 112, may be disposed under the non-display area. Touch sensors may be disposed in the non-display area, which touch sensors may be extended from the touch sensors in the display area or distinct or separate touch sensors from the touch sensors in the display area. A touch, including a gesture, may be associated with the display area, the non-display area, or both areas. The touch sensors may extend across substantially the entire non-display area or may be disposed in only part of the non-display area.

Figure 2:
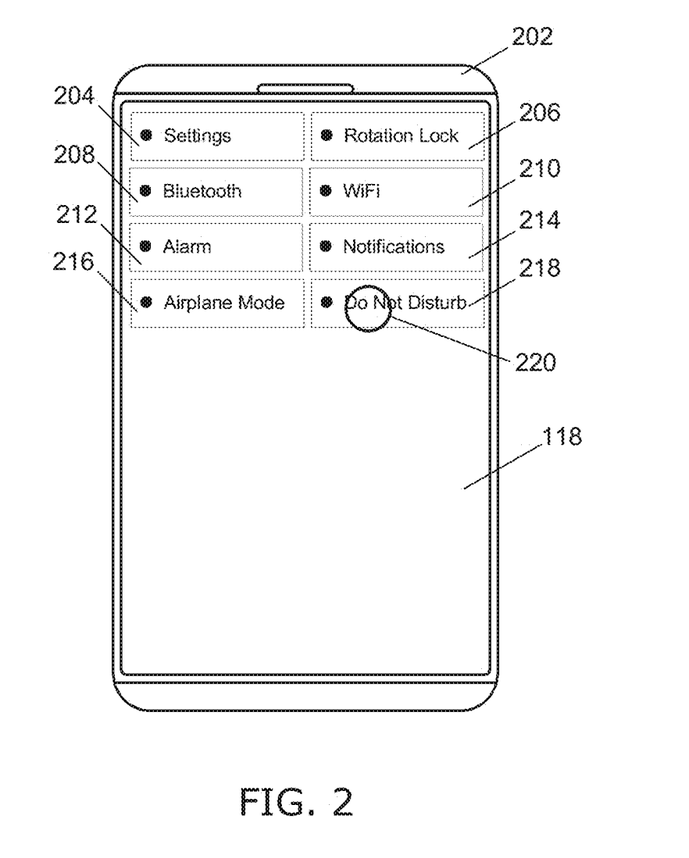
FIG. 2 is a front view of an example of a portable electronic device in accordance with the disclosure.

A front view of an example of the electronic device 100 is shown in FIG. 2. The electronic device 100 includes a housing 202 in which the touch-sensitive display 118 is disposed. The housing 202 is utilized to enclose components such as the components shown in FIG. 1.

Information may be displayed on the touch-sensitive display 118. In the example illustrated in FIG. 2, the information displayed includes selectable options. Each of the selectable options is selectable, for example, by a touch on area at which the selectable option is displayed on the touch-sensitive display 118. The selectable options include a settings option 204 to enter a settings menu or submenu, for example, to control various portable electronic device settings, a rotation lock option 206 to lock orientation of the display of information on the portable electronic device in the portrait or landscape orientation, a Bluetooth® option 208 to turn on and off Bluetooth communications, a WiFi option 210 to turn on and off and control WiFi communications, an Alarm option 212 to turn on and off an alarm on the electronic device, a Notifications option 214 to control notifications from the portable electronic device, an Airplane Mode option 216 to turn on and off all communication capabilities; and a Do Not Disturb option 218 to enter and exit a Do Not Disturb mode of the portable electronic device 100. While in the Do Not Disturb mode, the portable electronic device 100 is operable to send and receive communications. Notification of receipt of the communications is suppressed, however. For example, the ringtone for cellular telephone calls may be turned off or silenced. Additionally, the notifications for data communications such as email messages, text messages, voice-over-IP calls, and social media notifications are turned off such that notification tones or tunes are turned off. Notification lights, such as an LED light or lights, which may be utilized as a visual notification of receipt of such communications, are also turned off.

The selectable options may be displayed, for example, in response to receipt of an input, such as a gesture input from a homescreen of the portable electronic device. The gesture may be any suitable gesture from the homescreen or from any other suitable screen. The selectable options may also be displayed in response to receipt of a selection of a button or a selection from a menu, such as a settings menu, or any other suitable input at the portable electronic device 100.

Figure 3:
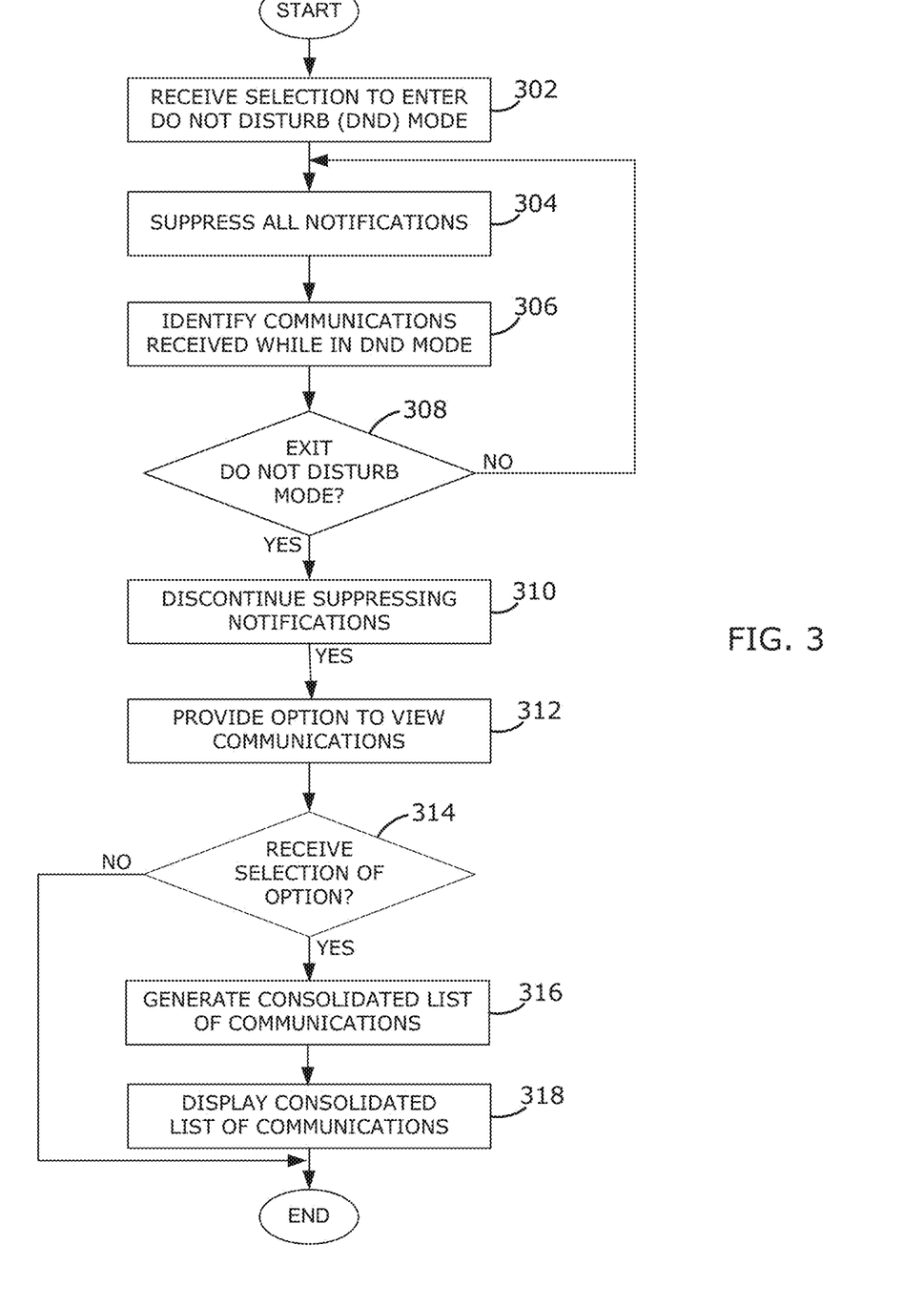
FIG. 3 is a flowchart illustrating a method of controlling a portable electronic device in accordance with the disclosure.

A flowchart illustrating a method of controlling notifications is shown in FIG. 3. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, such as a non-transitory computer-readable device.

The process may be carried out at any suitable time during operation of the portable electronic device. A selection to enter the do not disturb mode is received at 302. The selection to enter the do not disturb mode may be received from a selectable options list or menu such as the selectable options list illustrated in FIG. 2. Alternatively, the selection to enter the do not disturb mode may be received from selection of an option in a notifications menu or submenu, or from selection of a hardware button on the portable electronic device 100. Optionally, the do not disturb mode may be set based on time such that entry and exit into the do not disturb mode is controlled based on the clock time and entry and exit is automatic after the entry and exit times and dates are selected. For example, entry and exit may be programmed each day for one hour between 12:00 and 1:00 PM. Alternatively, the do not disturb mode may be controlled based on location. For example, the portable electronic device 100 may detect a specific short-range communication such as a BLUETOOTH® Low-Energy Beacon (BTLE) when the portable electronic device is in a location, such as a meeting room. Upon detecting the presence of the BTLE beacon, the do portable electronic device 100 enters the do not disturb mode. When the BTLE beacon is no longer detected, the portable electronic device exits the do not disturb mode. In another alternative, a geo-fencing API and location service on the portable electronic device 100 may be utilized to establish a place or area in which the user wishes to enter the do not disturb mode. For example, an area around a point of interest such as a library may be established as an area in which the portable electronic device 100 enters the do not disturb mode. The portable electronic device exits the do not disturb mode when the portable electronic device 100 leaves the area.

In response to receipt of the selection to enter the do not disturb mode at the portable electronic device 100, notifications for communications received at the portable electronic device 100 are suppressed 304. The notifications that are suppressed include audible, visual, and tactile notifications. Thus, audible tones or tune notifications, visual lights or display notifications, and vibratory or other tactile feedback notifications are suppressed. Thus, notifications are not provided for any new notifications received at the portable electronic device 100 after the do not disturb mode is entered, and prior to exiting the do not disturb mode.

Communications are still received at the portable electronic device 100 while in the do not disturb mode but notifications are not provided when such communications are received. Optionally, electronic communications such as email, text messages, telephone calls, voice-over-IP calls, and social media messages that are received while in the do not disturb mode may not be displayed when a list of such messages is displayed while still in the do not disturb mode. The communications received at the portable electronic device 100 are identified 306 as communications received while in the do not disturb mode and are stored in memory for later display, however.

In response to exiting the do not disturb mode at 308, suppression of notifications is discontinued 310 and an option is provided 312 to view communications received while in the do not disturb mode. When suppression of notifications is discontinued at 310, notifications are provided for new communications received at the portable electronic device 100 after exiting the do not disturb mode. The portable electronic device 100 may exit the do not disturb mode in response to receipt of a selection of an option to exit the do not disturb mode. The option may be received from detection of a touch on a selectable option in a selectable options list or menu such as the selectable options list illustrated in FIG. 2. Alternatively, the selection to exit the do not disturb mode may be received from selection of an option in a notifications menu or submenu, or from selection of a hardware button on the portable electronic device 100. Optionally, the do not disturb mode may be set based on time such that entry and exit into the do not disturb mode is controlled based on the clock time and entry and exit is automatic after the entry and exit times and dates are selected. Alternatively, the portable electronic device 100 may exit the do not disturb mode when a BTLE beacon is no longer detected or when the portable electronic device 100 leaves a designated area.

The option to view communications received while in the do not disturb mode may be provided in a selectable option that is displayed when the do not disturb mode is exited. For example, a window including a selectable button or element may be displayed or a selectable button may be provided in any other suitable format for selection to view a combined list of communications received while the portable electronic device was in the do not disturb mode.

In response to receipt of selection of the option to view communications received while in the do not disturb mode at 314, a consolidated list of communications received while in the do not disturb mode is generated 316 and displayed at 318. Alternatively, the consolidated list may be generated prior to selection of the option to view communications received while the do not disturb mode and the consolidated list is displayed in response to receipt of selection of the option to view the communication received while the do not disturb mode.

Figure 4:
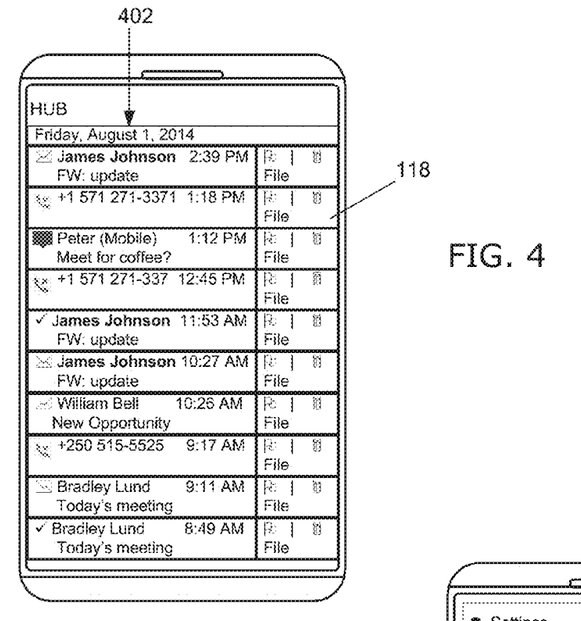
FIG. 4 through FIG. 6 are front views of examples of a portable electronic device in accordance with the disclosure.

Continued reference is made to FIG. 3 and to FIG. 2 and FIG. 4 through FIG. 6, which show front views of examples of a portable electronic device 100. As illustrated in FIG. 4, a HUB 402, which is combined list of communications sent and received at the portable electronic device 100 may be provided in response to selection of a HUB option or feature on the portable electronic device 100. The HUB may include all communications sent and received at the portable electronic device 100 or may selectively include communication types. For example, the types of communications that are included in the HUB may be user-selectable. In the example illustrated in FIG. 4, the HUB includes email messages, text messages, and cellular telephone calls. The hub may also include voice-over-IP calls and social media notifications.

Selection of an option to enter the do not disturb mode is received 302. In this example, a touch is detected at a location illustrated by the circle 220 in FIG. 2. The location of the touch, illustrated by the circle 220, corresponds with the location of the Do Not Disturb option 218 in the selectable options displayed on the touch-sensitive display 118. The processor 102 determines that the detected touch corresponds to the selection of the Do Not Disturb option 218, thereby receiving selection of the option to enter the do not disturb mode.

For the purpose of the present example, the selection of the option to enter the do not disturb mode is received at 3:01 PM and portable electronic device 100 remains in the do not disturb mode until 5:00 PM. While the portable electronic device 100 is in the do not disturb mode, all notifications are suppressed 304 and communications that are received are identified 306 but are not displayed.

At 5:00 PM, selection of an option to exit the do not disturb mode is received 308. A second touch is detected at a location illustrated by the circle 502 in FIG. 5. The location of the touch, illustrated by the circle 502, corresponds with the location of the Do Not Disturb option 218 in the selectable options displayed on the touch-sensitive display 118. The processor 102 determines that the detected touch corresponds to the selection of the Do Not Disturb option 218, thereby receiving selection of the option to exit the do not disturb mode.

In response to receipt of the selection of the option to exit the do not disturb mode, suppression of notifications is discontinued 310 and an option 504 to view a consolidated list of communications received at the portable electronic device 100 while in the do not disturb mode is provided 312. In the example shown in FIG. 5, the option 504 is provided with information confirming that the portable electronic device 100 has exited the do not disturb mode and providing the user with the option 504 to view the consolidated list of communications received at the portable electronic device 100 while in the do not disturb mode and a second option 506 not to view the consolidated list of communications received at the portable electronic device 100 while in the do not disturb mode.

Figure 5:
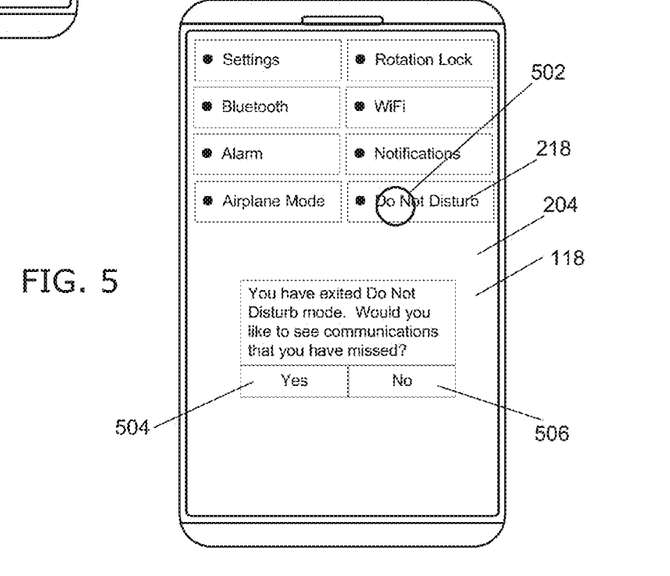

A touch is detected at a location that corresponds with the location of the option 504 to view the consolidated list of communications received at the portable electronic device 100 while in the do not disturb mode. The processor 102 determines that the detected touch corresponds to the selection, thereby receiving selection of the option 504 to view the consolidated list of communications received at the portable electronic device 100 while in the do not disturb mode.

Figure 6:
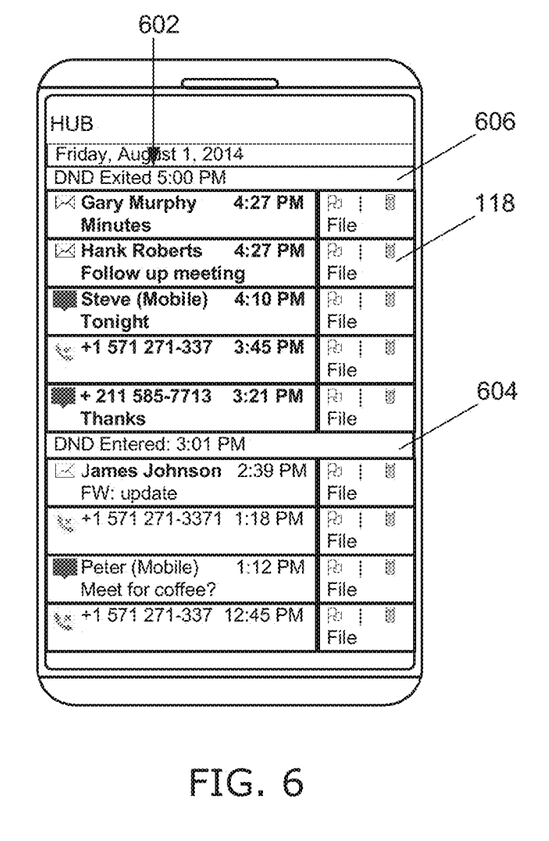

An example of the consolidated list of communications received at the portable electronic device 100 while in the do not disturb mode is shown in FIG. 6. In the example of FIG. 6, the consolidated list 602 includes communications received at the portable electronic device 100 when the portable electronic device 100 was not in the do not disturb mode. The consolidated list 602 includes a first indicator 604 identifying entry into the do not disturb mode and a second indicator 606 identifying exit of the do not disturb mode. The first indicator 604 and second indicator 606 act as book ends, thereby labeling all communications listed between the first indicator 604 and the second indicator 606 as communications received at the portable electronic device 100 while in the do not disturb mode.

In the example shown, a text message was received at 3:21, a telephone call was received at 3:45, a second text message was received at 4:10, an email was received at 4:27, and a second email was received at 4:27.

Optionally, the consolidated list of communications received at the portable electronic device 100 while in the do not disturb mode may be displayed without displaying any other communications in the consolidated list. Thus, the consolidated list may include only those communications received at the portable electronic device 100 while in the do not disturb mode and no communications received at the portable electronic device 100 while the portable electronic device 100 is not in the do not disturb mode.

Alternatively or in addition to providing the first indicator 604 and the second indicator 606, the communications may be displayed in a different font, color, highlighting, italics, or any other suitable identifiable attributes that differ from the attributes of communications received while not in the do not disturb mode such that the communications received while in the do not disturb mode are identifiable and distinguishable from communications received at the portable electronic device while the portable electronic device 100 is not in the do not disturb mode.

As indicated above, the consolidated list may include all communications sent and received at the portable electronic device 100 or may selectively include communication types. For example, the types of communications that are included in the HUB may be user-selectable such that the communications included in the consolidated list are user-customizable.

Advantageously, the portable electronic device enters a do not disturb mode in response to receipt of a selectable option to enter the do not disturb mode in which notifications of communications are suppressed. When the portable electronic device exits the do not disturb mode, an option to display a consolidated list of all communications received while the portable electronic device was in the do not disturb mode is provided. In response to selection of the option to display the consolidated list, the list is displayed. The list includes all communications received during the do not disturb period in which the do not disturb mode was enabled. Thus, the list is a summary of communications, which may include a plurality of different communication types, such as email messages, text messages, cellular telephone calls, voice-over-IP calls and messages, social media notifications, and so forth. The consolidated list facilitates easy identification of all missed communications in a single list. Thus, navigation through different applications and to multiple screens to identify missed communications is unnecessary.

According to one example, a method of controlling a portable electronic device includes, in response to receipt of selection of an option to enter a do not disturb mode at the portable electronic device, suppressing notifications for the communications received at the portable electronic device while in the do not disturb mode. The method also includes, in response to exiting the do not disturb mode, discontinuing suppressing notifications for new communications received at the portable electronic device, providing an option to view the communications received at the portable electronic device while in the do not disturb mode and, in response to receipt of selection of the option to view the communications received while in the do not disturb mode, displaying a consolidated list of the communications received at the portable electronic device while in the do not disturb mode. The consolidated list includes a plurality of electronic communication types.

According to another example, an electronic device includes a display, an input device to receive input to the portable electronic device, a wireless communications subsystem to enable wireless communication to and from the portable electronic device, and a processor coupled to the display, the input device, and to the wireless communications subsystem. The processor is operable to, in response to receipt of selection of an option to enter a do not disturb mode at the input device, suppress notifications for the communications received at the portable electronic device via the wireless communications subsystem while in the do not disturb mode. The processor is also operable to, in response to exiting the do not disturb mode, discontinue suppressing notifications for new communications received at the portable electronic device, provide an option to view the communications received at the portable electronic device while in the do not disturb mode, and, in response to receipt of selection of the option to view the communications received while in the do not disturb mode, cause the display to display a consolidated list of the communications received at the portable electronic device while in the do not disturb mode. The consolidated list includes a plurality of electronic communication types.

The scope of the claims should not be limited by the preferred embodiments set forth in the examples, but should be given the broadest interpretation consistent with the description as a whole.

What is claimed is:

1. A method comprising:
   in response to receipt of selection of an option to enter a do not disturb mode at a portable electronic device, suppressing notifications for the communications received at the portable electronic device while in the do not disturb mode;
   in response to exiting the do not disturb mode:
      discontinuing suppressing notifications for new communications received at the portable electronic device;
      providing an option to view the communications received at the portable electronic device while in the do not disturb mode and,
      in response to receipt of selection of the option to view the communications received while in the do not disturb mode, displaying a consolidated list of the communications, a first indicator identifying entry into the do not disturb mode, and a second indicator identifying exit from the do not disturb mode, the consolidated list of the communications including the communications received at the portable electronic device while in the do not disturb mode and communications received at the portable electronic device while not in the do not disturb mode, the consolidated list including a plurality of electronic communication types, thereby providing a displayed list of all missed communications including at least two different communication types, the communication types comprising email messages, text messages, cellular telephone calls, voice-over-IP calls, and social media notifications, and wherein the communications received at the portable electronic device while in the "do not disturb" mode are displayed between the first indicator and the second indicator within the consolidated list of communications.

2. The method according to claim 1, comprising receiving a selection of an option to exit the do not disturb mode and exiting the do not disturb mode.

3. The method according to claim 1, wherein the communications received while in the do not disturb mode are displayed utilizing display attributes that differ from the display attributes of the communications received while not in the do not disturb mode.

4. The method according to claim 1, wherein the communications received while in the do not disturb mode are labelled for identification as received while in the do not disturb mode.

5. The method according to claim 1, wherein the consolidated list of communications includes all communications received at the portable electronic device while in the do not disturb mode.

6. The method according to claim 1, wherein the communication types included in the consolidated list of communications are selectable such that the list is user-customizable.

7. A non-transitory computer-readable device having computer-readable code executable by at least one processor of the portable electronic device to perform the method of claim 1.

8. A portable electronic device comprising:
   a display;
   an input device to receive input to the portable electronic device;
   a wireless communications subsystem to enable wireless communication to and from the portable electronic device;
   a processor coupled to the display, the input device, and to the wireless communications subsystem to:
      in response to receipt of selection of an option to enter a do not disturb mode at the input device, suppress notifications for the communications received at the portable electronic device via the wireless communications subsystem while in the do not disturb mode;
      in response to exiting the do not disturb mode:
         discontinue suppressing notifications for new communications received at the portable electronic device;
         provide an option to view the communications received at the portable electronic device while in the do not disturb mode and,
         in response to receipt of selection of the option to view the communications received while in the do not disturb mode, cause the display to display a consolidated list of the communications, a first indicator identifying entry into the do not disturb mode, and a second indicator identifying exit from the do not disturb mode, the consolidated list of the communications including the communications received at the portable electronic device while in the do not disturb mode and communications received at the portable electronic device while not in the "do not disturb" mode, the consolidated list including a plurality of electronic communication types, thereby providing a displayed list of all missed communications including at least two different communication types, the communication types comprising email messages, text messages, cellular telephone calls, voice-over-IP calls, and social media notifications, and wherein the communications received at the portable electronic device while in the "do not disturb" mode are displayed between the first indicator and the second indicator within the consolidated list of communications.

9. The portable electronic device according to claim 8, wherein the portable electronic device exits the do not disturb mode in response to receipt of a selection of an option to exit the do not disturb mode.

10. The portable electronic device according to claim 8, wherein the communications received while in the do not disturb mode are displayed utilizing display attributes that differ from the display attributes of the communications received while not in the do not disturb mode.

11. The portable electronic device according to claim 8, wherein the communications received while in the do not disturb mode are labelled for identification as received while in the do not disturb mode.

12. The portable electronic device according to claim 8, wherein the consolidated list of communications includes all communications received at the portable electronic device while in the do not disturb mode.

13. The portable electronic device according to claim 8, wherein the communication types included in the consolidated list of communications are selectable such that the list is user-customizable.

\* \* \* \* \*